United States Patent Office 3,225,766
Patented Dec. 28, 1965

3,225,766
METHOD OF MAKING ABSORBABLE SURGICAL
SUTURES FROM POLY BETA HYDROXY ACIDS
James N. Baptist, Clarksville, and John B. Ziegler, Olney,
Md., assignors to W. R. Grace & Co., New York, N.Y.,
a corporation of Connecticut
No Drawing. Filed Mar. 26, 1962, Ser. No. 182,682
4 Claims. (Cl. 128—335.5)

This invention relates to a method for making prosthetic devices and surgical sutures. In one specific aspect, it relates to a method for making prosthetic devices and surgical sutures which can be absorbed in the human body.

The use of prosthetic devices has allowed great advances in medical science. Numerous recoveries of patients are effected by substitution of prosthetic devices for injured or diseased parts of the human body. Frequently, these devices have a temporary function. That is, they must serve their purpose only until an organ or other part of the body returns to a state of good health.

Compositions used for prosthetic devices are usually plastic or metal. However, plastics that have been used in the past and metals usually must be removed from the body after healing has taken place. This, obviously, requires another surgical procedure.

It would be desirable to have prosthetic devices which are required for only a relatively short time within the body made from some material which would dissolve and be absorbed by or eliminated from the body with no harmful side effects.

One use for these devices can be illustrated by a situation involving a severed blood vessel or ureter. A short tube of absorbable plastic could be inserted in the vessel and the cut ends slipped over the ends of the plastic tube. With the plastic tube as a support, the two ends could easily be stitched together and left to heal. The plastic tube would slowly dissolve after healing has taken place.

Another use for the devices of our invention can be envisioned in the surgical repair of a hernia. A rigid supporting device of plastic could be inserted in the weakened area. This device would provide mechanical support until enough scar tissue formed to prevent further trouble. The plastic would then slowly dissolve.

The advantage and uses of absorbable surgical sutures are already well known.

It is an object of this invention to provide a method for making prosthetic devices and surgical sutures which will dissolve within the human body with no harmful side effects.

We have found that polyesters produced from the beta-hydroxy acids which are natural metabolites are useful for making absorbable prosthetic devices and surgical sutures. When polymers of these beta-hydroxy acids are implanted in living flesh, they are attacked within the body by esterase enzymes and slowly absorbed. However, the absorption is slow enough that temporary devices or sutures usually serve their purpose before they are materially weakened. The action of the enzyme breaks the polymer down to monomer units of beta-hydroxy acids. These acids are identical to natural tissue metabolites in the normal human body. Therefore, the body will react to the polymer product as it does to products of its own metabolism. Since esterases can attack only the surface of these articles, the rate of absorption can be controlled by varying their thicknesses.

The acids found to be suitable in the present invention are products of natural tissue metabolism.

We have found that poly-beta-hydroxy butyric acid formed by certain bacteria is satisfactory for our purposes. The bacteria *Bacillus megaterium*, *Rhodospirillum rubrum* and a species of *Rhizobium* synthesize material which is suitable for preparation of our absorbable polymer.

The present polymers can be produced by bacteria grown in artificial media. For example, cultures of *Rhizobium* are grown in a glucose, yeast and mineral medium until the dry weight of the culture reaches 2.8 g./l. In most experiments, this was followed simply by measuring the turbidity in arbitrary units. This usually takes about 3 days. The cells are then harvested by centrifugation and dried with acetone. The polymer is extracted from the cells with chloroform, then precipitated from the chloroform solution with ether. Instead of precipitating the polymer, the chloroform can be evaporated under vacuum to recover the product. Cultures of suitable bacteria may be obtained from type culture collections.

The poly-beta-hydroxy propionic acid used in this invention was prepared by irradiation of beta-propiolactone as described in copending application Serial No. 100,812, filed April 5, 1961 now Patent No. 3,111,469. Briefly, the process consists of subjecting frozen beta-propiolactone to high energy irradiation and recovering the polyester as product. For example, poly-beta propionic acid may be prepared by subjecting beta-propiolactone maintained at a temperature of −40 to −60° C. to a radiation dosage of from 0.01 to about 10 megarads.

Poly-beta-hydroxy acids can easily be molded into rigid prosthetic devices using standard molding techniques. Compression molding is one of the preferred techniques since these devices probably would not be mass produced.

Absorbable surgical sutures can be made from poly-beta-hydroxy acids. The sutures in this invention have several advantages over the conventional cat gut sutures in that the sutures of the present invention are more easily sterilized, stronger, and more uniform than cat gut. The latter has always presented a sterilization problem. Heat is the generally accepted method for sterilization but the process is not simple. Cat gut, which normally contains 15–20% moisture, must be dried before sterilization temperatures are applied. Otherwise, hydrolysis, due to the water present, will occur with a subsequent, nearly complete, loss of tensile strength. The sterilizing temperature is between 150 and 155° C., and this temperature is critical. Below 150° C., the material is not thoroughly sterile and above 155° C., it tends to become brittle. The sterile cat gut must then be conditioned with water before it is ready for use.

Pure poly-beta-hydroxy butyric acid can be sterilized by applying supreheated steam at 120° C. for about 20 minutes. Pure poly-beta-hydroxy propionic acid can be sterilized in the presence of moisture. It contains very little water of hydration so hydrolysis will not occur. Heating to 80–100° C. on each of three successive days will ensure sterility. These polymers do not have to be dried before sterilization nor specially conditioned before use.

The polyesters of this invention can be extruded or spun into threads to be used as sutures using standard techniques. These threads can be colored where color is desirable.

Poly-beta-hydroxy butyric acid can be extruded at about 180° C., if it is done quickly, without measurable thermal degradation. Poly-beta-hydroxy propionic acid can be extruded between 100–110° C. Both polyesters can be spun into fibers from solution. They are soluble in such solvents as methylene chloride, chloroform and tetrachloroethane.

Preparation of bacterial poly-beta-hydroxy butyric acid is illustrated by the following specific but non-limiting example:

Example I

Cutures of Rhizobium (Strain B–142, obtained from Colonial Microbiological Research Institute, Port of Spain, Trinidad) were grown in a medium containing 40 g./l. glucose, 1 g./l. yeast extract, and 50 ml./l. stock minerals. The stock mineral solution contained the following:

|  | G./l. |
|---|---|
| $(NH_4)_2SO_4$ | 10.0 |
| $KH_2PO_4$ | 10.0 |
| $Na_2HPO_4 \cdot 7H_2O$ | 18.9 |
| $MgSO_4$ | 2.0 |
| $CaCl_2$ | 0.2 |
| $FeCl_3$ | 0.1 |

The bacteria were allowed to grow in the medium at room temperature until the turbidity of the culture reached a maximum which usually took 3 days. The medium was constantly and vigorously agitated with a stream of filtered air. After 3 days, the cells were harvested from the liquid culture by centrifugation. The wet cell mass was mixed with an excess of acetone, filtered and then air dried to a powder. The polyester was extracted by mixing the dry cells with enough chloroform to give a 2% polyester solution. This slurry was refluxed for 30 minutes and then cooled to 0° C. with ice. The cooled mixture was filtered through a medium porosity glass filter and a clear filtrate containing poly-beta-hydroxy butyric acid obtained.

The pure polymer was recovered from the chloroform filtrate by precipitating with ether, filtering and then drying in a vacuum oven at 40–50° C. to a constant weight.

Film strips were made by dissolving a one gram sample of polymer in 50 ml. of methylene chloride, spreading the solution on a plate, allowing the solvent to evaporate, and cutting the film into strips.

The polymer from this example was tested to determine necessary time for absorption within an animal body and to establish biological safety. These tests were carried out as described hereafter.

Example II

Three male albino rabbits weighing 2051 to 3553 grams were used for this test. Each of the three rabbits received one 2 x 20 mm. film strip of poly-beta-hydroxy butyric acid, prepared as in Example I, implanted subcutaneously in its right hind leg and three 2 x 20 mm. film strips of the same polymer implanted intramuscularly, two in the left hind leg and one in the right hind leg. Aseptic surgical techniques were used for all implants. 0.50 ml. of Penicillin G was administered intramuscularly to the rabbits following implantation of the test material to prevent infection.

Eight weeks following implant, the animals were weighed, sacrificed by air embolism and autopsied. The remaining intramuscular film strip and the subcutaneous film strip in each animal was removed and examined. The sites of the subcutaneous and the intramuscular implants were examined grossly and subjected to histological examination.

The following tabulation shows weight and site of implant and duration of each test.

| Animal | Sample Number | Original Weight (mg.) | Site of Implant | Duration of Exposure (weeks) |
|---|---|---|---|---|
| IIA | 1 | 1.3 | Intramuscular | 2 |
|  | 2 | 1.2 | ----do---- | (¹) |
|  | 3 | 1.6 | ----do---- | 8 |
|  | 4 | 1.4 | Subcutaneous | 8 |
| IIB | 5 | 1.7 | Intramuscular | 2 |
|  | 6 | 1.4 | ----do---- | 4 |
|  | 7 | 1.4 | ----do---- | 8 |
|  | 8 | 1.1 | Subcutaneous | 8 |
| IIC | 9 | 1.5 | Intramuscular | 2 |
|  | 10 | 1.1 | ----do---- | 4 |
|  | 11 | 1.0 | ----do---- | 8 |
|  | 12 | 1.0 | Subcutaneous | 8 |

¹ Not recovered.

None of the filmstrips recovered could be weighed to show a significant weight change because foreign matter had become attached to each sample. Therefore, they were examined under a microscope to observe their condition. The following observations were made:

| Sample No. | Edges | Form | Discoloration* | Holes | General Condition |
|---|---|---|---|---|---|
| 1 | Smooth | Slightly broken up | Very discolored | None | Fair. |
| 2 | Not recovered. | | | | |
| 3 | Very smooth | Slightly broken up | Nearly original | None | Good. |
| 4 | ----do---- | Film in 2 or 3 pieces | Slightly discolored | ----do---- | Fair. |
| 5 | Smooth | In 2 or 3 pieces | ----do---- | ----do---- | Do. |
| 6 | ----do---- | ----do---- | ----do---- | ----do---- | Do. |
| 7 | Slightly ragged | ----do---- | Original color | ----do---- | Good. |
| 8 | Very ragged | ----do---- | Slightly discolored | ----do---- | Fair. |
| 9 | Slightly ragged | Slightly broken up | Very discolored | ----do---- | Poor. |
| 10 | ----do---- | In 2 or 3 pieces | Slightly discolored | ----do---- | Fair. |
| 11 | Very ragged | ----do---- | Very broken up | ----do---- | Poor. |
| 12 | Smooth | In original shape | Original color | ----do---- | Fair. |

*Discoloration was red or reddish brown in most cases so was probably bloody material picked up on the surface when the film was removed from the rabbit.

The term "general condition" was chosen to indicate any disintegration which could be considered as evidence that the film was dissolving. It can be seen that in all but two cases (i.e. samples 3 and 7, where the film was listed as being in good condition) the film had dissolved substantially.

Histopathologic evaluation of the implantation sites revealed granulomatous foreign body reactions but these were without effect on the underlying muscle area.

Example III

Three male albino rabbits, weighing between 2051 and 3553 grams received implants of 2 x 20 mm. film strips of poly-beta-hydroxy propionic acid in the same manner as that described in Example II. The polymer was prepared by the technique described in copending Patent No. 3,111,469 previously referred to. The films were made by placing a 1 gram sample of the polymer in a standard press at 110° C. and 10,000 p.s.i. pressure for 30 seconds. All other test procedures were the same as Example II.

The following table shows the weight and site of implant and the duration of each test.

| Animal | Sample Number | Original Weight (mg.) | Site of Implant | Duration of Exposure (weeks) |
|---|---|---|---|---|
| IIIA | 1 | (1) | Intramuscular | 2 |
|  | 2 | (1) | ----do---- | 4 |
|  | 3 | (1) | ----do---- | 2 5 |
|  | 4 | (1) | Subcutaneous | (2) |
| IIIB | 5 | (1) | Intramuscular | 2 |
|  | 6 | (1) | ----do---- | 4 |
|  | 7 | (1) | ----do---- | 8 |
|  | 8 | (1) | Subcutaneous | (3) |
| IIIC | 9 | (1) | Intramuscular | 4 |
|  | 10 | (1) | ----do---- | 8 |
|  | 11 | (1) | ----do---- | (3) |
|  | 12 | (1) | Subcutaneous | (3) |

[1] Samples 1-12 averaged 4.0.
[2] Animal found dead in its cage during fifth week of study. However autopsy indicated that death was not connected with the film implants.
[3] Not recovered.

The film strips recovered in this example could not be weighed for significant weight changes for the same reason recited in Example II. The following observations were made on the recovered film strips.

| Sample No. | Edges | Form | Discoloration | Holes | General Condition |
|---|---|---|---|---|---|
| 1 | Very smooth | In 2 or 3 pieces | Slightly discolored | None | Good. |
| 2 | Slightly ragged | Very broken up | ----do---- | ----do---- | Fair. |
| 3 | Smooth | Slightly broken up | Original color | More than 2 holes | Do. |
| 5 | ----do---- | In 2 or 3 pieces | Slightly discolored | None | Do. |
| 6 | Very ragged | Very broken up | ----do---- | ----do---- | Very poor. |
| 7 | ----do---- | ----do---- | Nearly original | 1 hole | Do. |
| 9 | Slightly ragged | Slightly broken up | Slightly discolored | None | Fair. |
| 10 | Very smooth | ----do---- | ----do---- | ----do---- | Do. |
| 11 | Slightly ragged | ----do---- | Nearly original | More than 2 holes | Poor. |

It can be seen from the data that all the subcutaneous implants dissolved in eight weeks and even in five weeks in the case of animal IIIA. All of the intramuscular implants had begun to dissolve as can be seen from observation of their condition.

Example IV

Samples of ground poly-beta-hydroxy butyric acid, prepared as in Example I, were injected intramuscularly into the same three animals used in Example II. This test was conducted concurrently with that described in Example II. A suspension of the ground plastic in 0.25 ml. of physiological saline was injected into the right front leg of each animal at a standard dose of 0.50 ml. The material was left in the animals for 8 weeks. After the animals were sacrificed, the area where the plastic was implanted in each animal was removed and examined histologically.

On examination, the samples of ground poly-beta-hydroxy butyric acid were observed in each case in a well-defined area at the site of intramuscular injection.

Histopathologic evaluation of the injection sites revealed granulomatous foreign body reactions which were without effect on the underlying muscle areas.

Example V

Samples of ground poly-beta-hydroxy propionic acid, prepared as described in Example III, were injected intramuscularly into the same three animals used in Example III. This test was conducted concurrently with that described in Example III. A suspension of the ground plastic in 0.25 ml. of physiological saline was injected into the right front leg of each animal at a standard dose of 0.50 ml. The conditions of this experiment were the same as those described in Example IV.

The areas of injection were recovered as described in Example IV and subjected to histological examination. As noted in Example III, Animal IIIA died after 5 weeks. The injection area in this animal was recovered at that time and examined.

The samples of ground poly-beta-hydroxy propionic acid were observed in each case in a well-defined area at the site of intramuscular injection.

Histopathologic evaluation of the injection sites revealed granulomatous foreign body reactions which were without effect on the underlying muscle areas.

It is obvious from a review of the data presented in Examples II, III, IV and V that the polymers of our invention are useful as absorbable prosthetic devices and surgical sutures.

What is claimed is:

1. A method for making absorbable prosthetic devices from bacterial poly beta hydroxy acids which comprises inoculating a growth medium with suitable bacteria, allowing the bacteria to grow until maximum turbidity of the culture is reached, harvesting and drying the cells, extracting the polymer from the dried cells, recovering and drying the pure polymer, and finally molding the polymer into prosthetic devices.

2. A method for making absorbable prosthetic devices from bacterial poly-beta-hydroxy butyric acid which comprises inoculating a growth medium with bacteria selected from the group consisting of *Bacillus megaterium*, *Rhodospirillum rubrum* and Rhizobium, allowing the bacteria to grow until maximum turbidity is reached, harvesting and drying the calls, extracting the polymer from the dried cells, recovering and drying the pure polymer, and finally molding the polymer into prosthetic devices.

3. A method for making absorbable surgical sutures from bacterial poly beta hydroxy acids which comprises inoculating a growth medium with suitable bacteria, allowing the bacteria to grow until maximum turbidity of the culture is reached, harvesting and drying the cells, extracting the polymer from the dried cells, recovering and drying the pure polymer, and finally forming the polymer into threads suitable for use as surgical sutures.

4. A method for making absorbable surgical sutures from bacterial poly beta hydroxy butyric acid which comprises inoctulating a growth medium with bacteria selected from the group consisting of *Bacillus megaterium*, *Rhodospirillum rubrum* and Rhizobium, allowing the bacteria to grow until maximum turbidity is reached, harvesting and drying the cells, extracting the polymer from the dried cells, recovering and drying the pure polymer, and finally forming the polymer into threads suitable for use as surgical sutures.

References Cited by the Examiner

UNITED STATES PATENTS

| | | | |
|---|---|---|---|
| 2,072,302 | 3/1937 | Herrmann et al. | 128—335.5 |
| 2,127,903 | 8/1938 | Bowen | 128—334 |
| 2,428,918 | 10/1947 | Miller | 128—334 |
| 2,487,885 | 11/1949 | Magoffin et al. | 260—78.3 |
| 3,021,310 | 2/1962 | Cox et al. | 260—78.3 |
| 3,036,959 | 5/1962 | Baptist | 195—47 |
| 3,044,942 | 7/1962 | Baptist | 128—334 X |

OTHER REFERENCES

Wilkinson et al.: Journal of General Microbiology, vol. 19; 1958, pages 198–210.

RICHARD A. GAUDET, *Primary Examiner.*

JORDAN FRANKLIN, *Examiner.*

DALTON L. TRULUCK, *Assistant Examiner.*